United States Patent [19]

Sulzbach

[11] Patent Number: 5,834,527

[45] Date of Patent: Nov. 10, 1998

[54] PROCESS FOR THE MANUFACTURE OF POLYURETHANE FOAM MOLDINGS

[75] Inventor: Hans-Michael Sulzbach, Königswinter, Germany

[73] Assignee: Maschinenfabrik Hennecke GmbH, Leverkusen, Germany

[21] Appl. No.: 676,495

[22] Filed: Jul. 8, 1996

[30] Foreign Application Priority Data

Jul. 14, 1995 [DE] Germany .......... 195 25 663.8
Nov. 29, 1995 [DE] Germany .......... 195 44 456.8

[51] Int. Cl.$^6$ .................................................. C08J 9/04
[52] U.S. Cl. ................. 521/130; 264/41; 264/50; 264/51; 521/80; 521/155; 521/159
[58] Field of Search .............. 521/159, 80, 130, 521/155; 264/41, 50, 51

[56] References Cited

U.S. PATENT DOCUMENTS 3,184,419  5/1965  Merriman .......................... 521/159
3,666,848  5/1972  Harper et al. ...................... 264/39
4,337,318  6/1982  Doyle .................................. 521/80
4,783,292  11/1988 Rogers ............................. 264/40.6
4,851,167  7/1989  Marc .................................. 264/26

FOREIGN PATENT DOCUMENTS 0145250   6/1985  European Pat. Off. .
89/00918  2/1989  WIPO .

OTHER PUBLICATIONS

Modern Plastics International, Mar. 1994, pp. 52–54.

*Primary Examiner*—John M. Cooney, Jr.
*Attorney, Agent, or Firm*—Joseph C. Gil; Noland J. Cheung

[57] ABSTRACT

A process for the manufacture of polyurethane foam moldings is described wherein carbon dioxide physically dissolved under pressure is used as the blowing agent and a pressure is maintained in the mold cavity during the introduction of the polyurethane reactive mixture so as to prevent the complete release of the dissolved carbon dioxide.

6 Claims, 3 Drawing Sheets

PROCESS FOR THE MANUFACTURE OF POLYURETHANE FOAM MOLDINGS

BACKGROUND OF THE INVENTION

Polyurethane foam moldings are conventionally manufactured by introducing a polyurethane reactive mixture containing a blowing agent into a mold cavity, with the blowing agent being released in the course of the polyaddition reaction between the isocyanate and isocyanate-reactive components of the mixture, causing the reactive mixture to foam and fill the mold cavity.

Blowing agents used are either low-boiling liquids such as low-molecular chlorofluorocarbons, methylene chloride, pentane, and the like, which evaporate due to the increase in temperature of the reactive mixture in the course of the exothermic polyaddition reaction, or water, which chemically releases carbon dioxide due to the reaction between the water and the isocyanate.

Conventionally the blowing agent is mixed with the polyol component for the polyaddition reaction, which is then mixed with the isocyanate.

It is also already known additionally to charge at least one of the reaction components of the polyaddition reaction with air, with the air producing bubble nuclei in the form of small air bubbles into which the blowing agent is released to produce a uniform pore structure.

It has also been proposed to use carbon dioxide as the blowing agent. The carbon dioxide is physically dissolved under pressure in the polyurethane reactive mixture. This creates the problem that, on expansion at ambient pressure, the polyurethane reactive mixture foams almost instantaneously to release the dissolved $CO_2$, thereby producing a froth which has a substantially reduced flowability compared with the unfoamed reactive mixture and which cannot be distributed without creating foam defects by destroying foam bubbles in the mold. Moreover, when such a "rigid" froth is filled into either an open mold or a closed mold, air or blowing agent is entrapped and the foam moldings obtained after curing consequently contain large voids.

DESCRIPTION OF THE INVENTION

Figure 1:
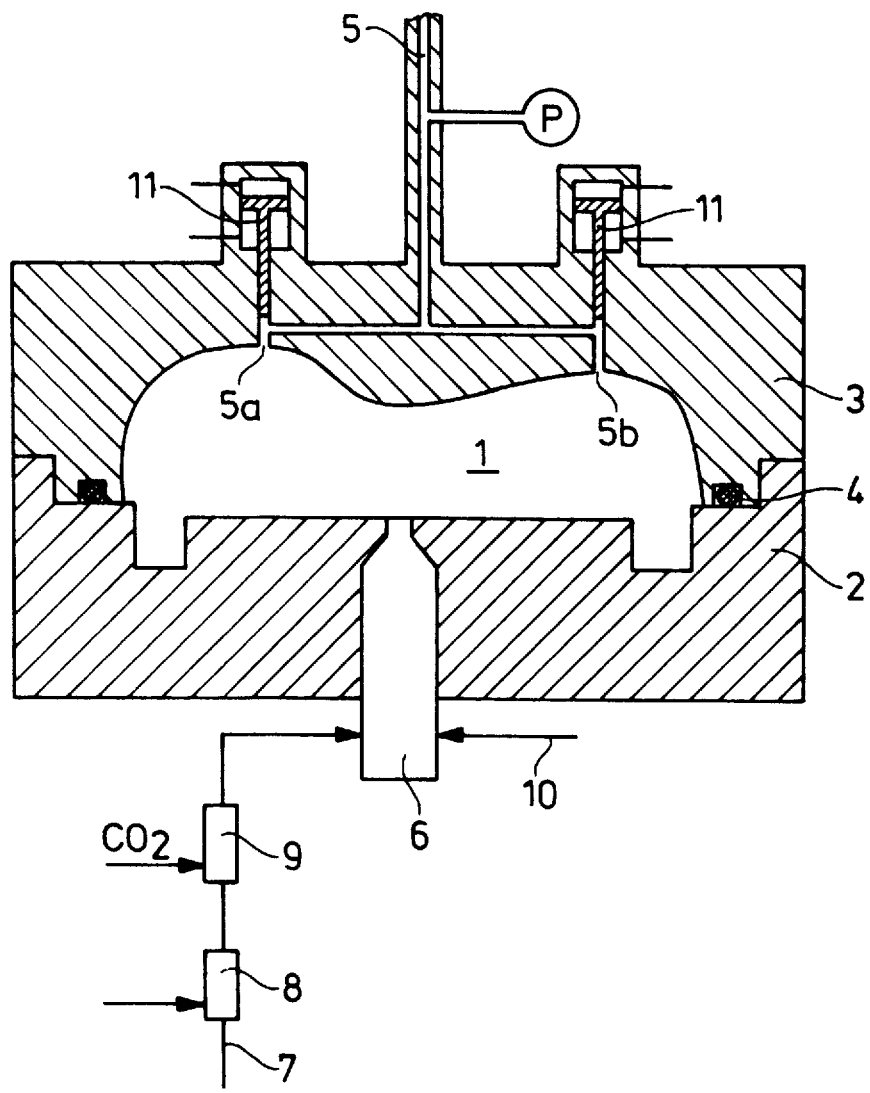
FIGS. 1, 2 and 3 illustrate various embodiments of the present invention.

According to the present invention, the closed mold is filled with the reactive mixture containing dissolved $CO_2$, with the pressure prevailing in the mold during the filling process being such that, at most, part of the dissolved $CO_2$ is released. The pressure is chosen so that the reactive mixture retains during the filling process a sufficient flowability for distribution in the mold without air inclusions.

The present invention provides a process for the manufacture of polyurethane foam moldings by the introduction of a polyurethane reactive mixture containing a blowing agent into a mold cavity, comprising a) dissolving carbon dioxide under pressure in the polyurethane reactive mixture as the blowing agent,
b) introducing the reactive mixture into a closed mold cavity,
c) maintaining the gas pressure in the mold cavity during the introduction of the reactive mixture at a pressure being such that complete foaming of the reactive mixture is prevented, and
d) reducing the gas pressure in the mold cavity, with (optionally further) foaming of the reactive mixture, until the foamed reaction mixture fills the whole of the mold cavity.

In step c), the pressure is maintained such that, at most, only a partial foaming occurs.

The reactive mixture is preferably produced using a high-pressure countercurrent injection mixing head suitable for the pouring operation, with cleaning rams (see, e.g., Becker/Braun: Kunststoff-Handbuch (Plastics Handbook), Volume 7, pages 178 to 182, 1993).

Preferably, the carbon dioxide is dissolved in the polyol component before the latter is mixed with the isocyanate component to produce the polyurethane reactive mixture.

The amount of dissolved carbon dioxide can preferably be between 0.5 and 7 wt. % based on the reactive mixture, corresponding to a saturation vapor pressure of 1 to 25 bar for the dissolved carbon dioxide. Depending on the amount of $CO_2$ dissolved, the foam moldings obtained have densities of 25 to 350 kg/m$^3$ when dissolved $CO_2$ is used as the only blowing agent.

A noticeable drop in the flowability of the reactive mixture, and hence an increase in rigidity unfavorable for distribution in the mold, is observed when the foam bubbles markedly exceed a size at which they come into mutual contact, i.e. when they acquire a non-spherical shape.

Preferably, therefore, the internal mold pressure during the introduction of the reactive mixture is at least 50% of the saturation vapor pressure of the total amount of originally dissolved $CO_2$. Particularly preferably, the internal mold pressure is 70 to 90% of the saturation vapor pressure so that about 10 to 30% of the dissolved $CO_2$ is already released during the introduction. For uniform distribution in the mold cavity, it is in fact particularly advantageous for the volume introduced to be as large as possible, provided the flowability is sufficient. On the other hand, in the case of molds of simple design, especially where the bottom side of the mold cavity is flat and horizontal, the reactive mixture can be introduced fully unfoamed to no disadvantage, i.e., it can be introduced into the mold at an internal mold pressure which is above the saturation concentration for the originally dissolved $CO_2$.

If the amount of reactive mixture predetermined for the foam molding is introduced into the mold, the internal mold pressure is reduced until the foamed reactive mixture fills the whole of the mold, optionally after the release of any other blowing agents used.

By controlling the rate of pressure reduction, it is possible to control the rising speed of the foam so that the shear forces produced in the foam do not exceed the flowability.

Because the whole of the intended amount of reactive mixture is initially filled into the mold against the pressure prevailing in the mold cavity, and the pressure in the mold cavity is only then reduced, or reduced shortly before the end of the filling process, it is possible to manufacture a foam molding of uniform pore structure.

In another preferred embodiment, the mold cavity is divided by means of a membrane into a chamber in which the gas pressure is maintained and a chamber into which the reactive mixture is filled. The membrane is arranged in the mold parting plane before the mold is closed. A gas pressure is then applied to one of the parts of the mold cavity produced by the membrane so that the membrane is lying against the contour of the other part of the mold cavity. The polyurethane reactive mixture is then introduced on the opposite side of the membrane to the gas pressure. After introduction of the intended amount of reactive mixture, the gas pressure on the other side of the membrane is reduced and the membrane is pushed towards the other side of the mold cavity as the reactive mixture foams.

In one variant of this preferred embodiment of the present invention, the membrane can be made of a plastic which is not wettable by the polyurethane reactive mixture, especially polyethylene or polytetrafluoroethylene, so that the membrane can be separated from the foam molding after the latter has cured and been released from the mold.

In another variant, the membrane can be made of a material which is wettable by the reactive mixture and adheres to the polyurethane, especially an optionally impregnated woven fabric or PVC or polypropylene, the membrane remaining as a lamination on the surface of the foam molding.

In another preferred embodiment, the contour of the mold cavity has movable elements which can be pushed into the mold cavity during the introduction of the reactive mixture. These movable elements of the contour reduce the volume of the mold cavity during the introduction of the reactive mixture. Particularly preferably the movable contour elements are designed so as to throttle the inflowing reactive mixture, i.e. the flow cross-section of the reactive mixture is reduced immediately after it has entered the mold cavity so as to effect rapid distribution of the reactive mixture into parts of the mold cavity which are further away from the introduction orifice.

In the case where the mold cavity is divided by means of a membrane into a gas pressure chamber and a filling cavity, at least one movable element is preferably arranged on the opposite side of the gas pressure chamber to the filling orifice.

Other movable contour elements can be provided on the side of the filling cavity if, due to the complexity of the mold cavity, the membrane cannot lie against the contour of the mold cavity without irreversible deformation before said cavity is filled with the reactive mixture.

FIG. 1 shows a mold cavity 1 which is formed by bottom and top mold halves 2, 3 and is closed gas-tight with the aid of a seal 4. A gas pressure of, e.g., 6 bar is produced in the mold cavity 1 via the gas supply line 5. The polyol component, in which air for creating bubble nuclei is dissolved (8) and, e.g., 3.5 wt. % of $CO_2$ is dissolved, is fed via the line 7 into the mixer 6 for preparing the polyurethane reactive mixture. 50 parts by weight of isocyanate per 100 parts by weight of polyol are also fed in via the line 10. After the mold cavity 1 has been ca. 11% filled from the mixer 6 with the partially foamed reactive mixture containing dissolved carbon dioxide, the supply of reactive mixture is stopped and, via the gas line 5, the gas pressure in the mold cavity is reduced until the reactive mixture foams to fill the whole of the mold cavity. The inlet orifices 5a and 5b into the mold cavity 1 from the gas supply line 5 are then closed, this being represented for example by the hydraulically displaceable pistons 11. After the reactive mixture has cured, the mold is opened and the molding removed. The density of the foam is 92 kg/m$^3$.

If the $CO_2$ content of the polyol component is raised to 8 wt. % and the reactive mixture is filled into the mold at an internal mold pressure of 14 bar (9% full prior to expansion), a foam density of 38 kg/m$^3$ is obtained.

A foam of about the same density is obtained if a polyol component containing 3.5 wt. % of $CO_2$ and 2 wt. % of $H_2O$ is used and the reactive mixture is filled into the mold at an internal mold pressure of 6 bar (4.5% full prior to expansion).

Figure 2:
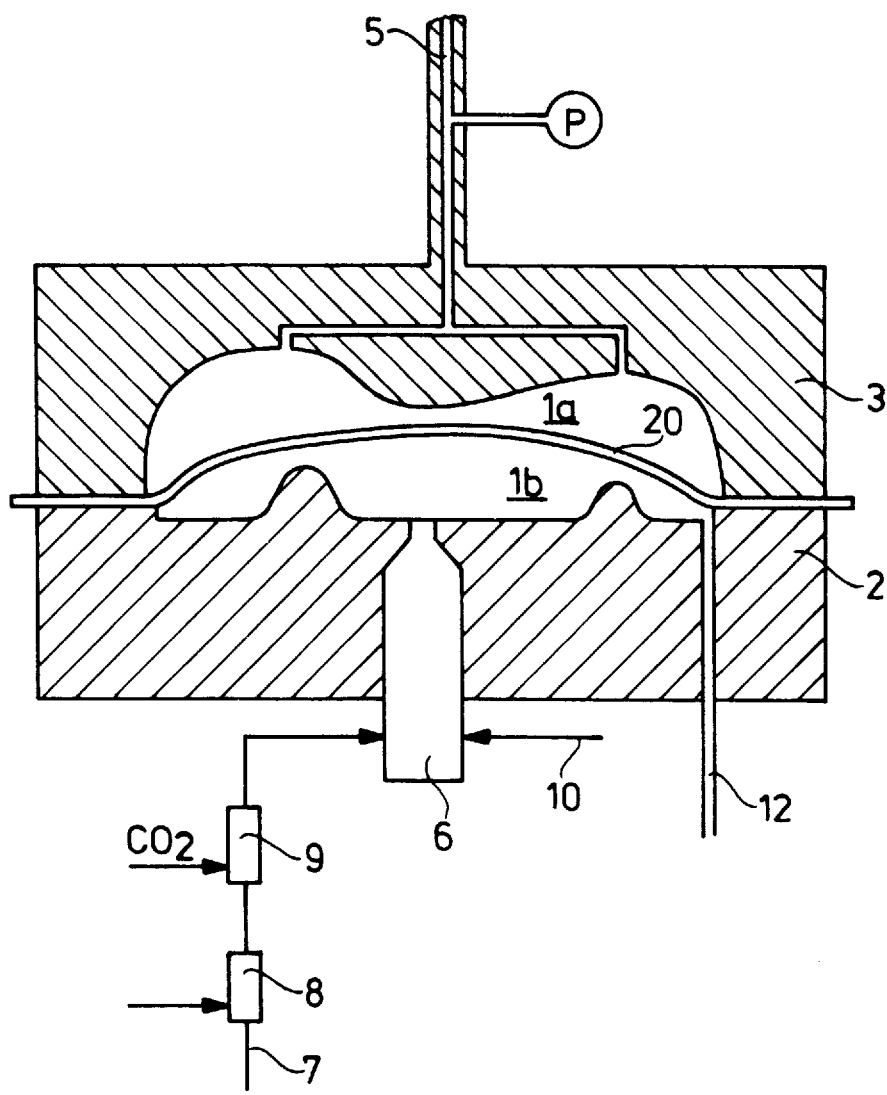

In the embodiment of the present invention according to FIG. 2, the mold cavity is divided by the membrane 20 into a gas pressure cavity 1a and a filling chamber 1b for the polyurethane reactive mixture. Before the reactive mixture is introduced from the mixer 6, a gas pressure is applied to the gas chamber 1a so that the membrane 20 is lying against the contour of the bottom half 2 of the mold. A vacuum line 12 can optionally be provided for removing gas residues from the filling cavity 1b. The reactive mixture is introduced into the filling chamber 1b, displacing the membrane 20. Via the gas line 5, the gas pressure in the gas chamber 1a is then reduced until, due to the foaming of the reactive mixture in the filling chamber 1b, the membrane 20 is lying against the contour of the top half 3 of the mold.

Figure 3:
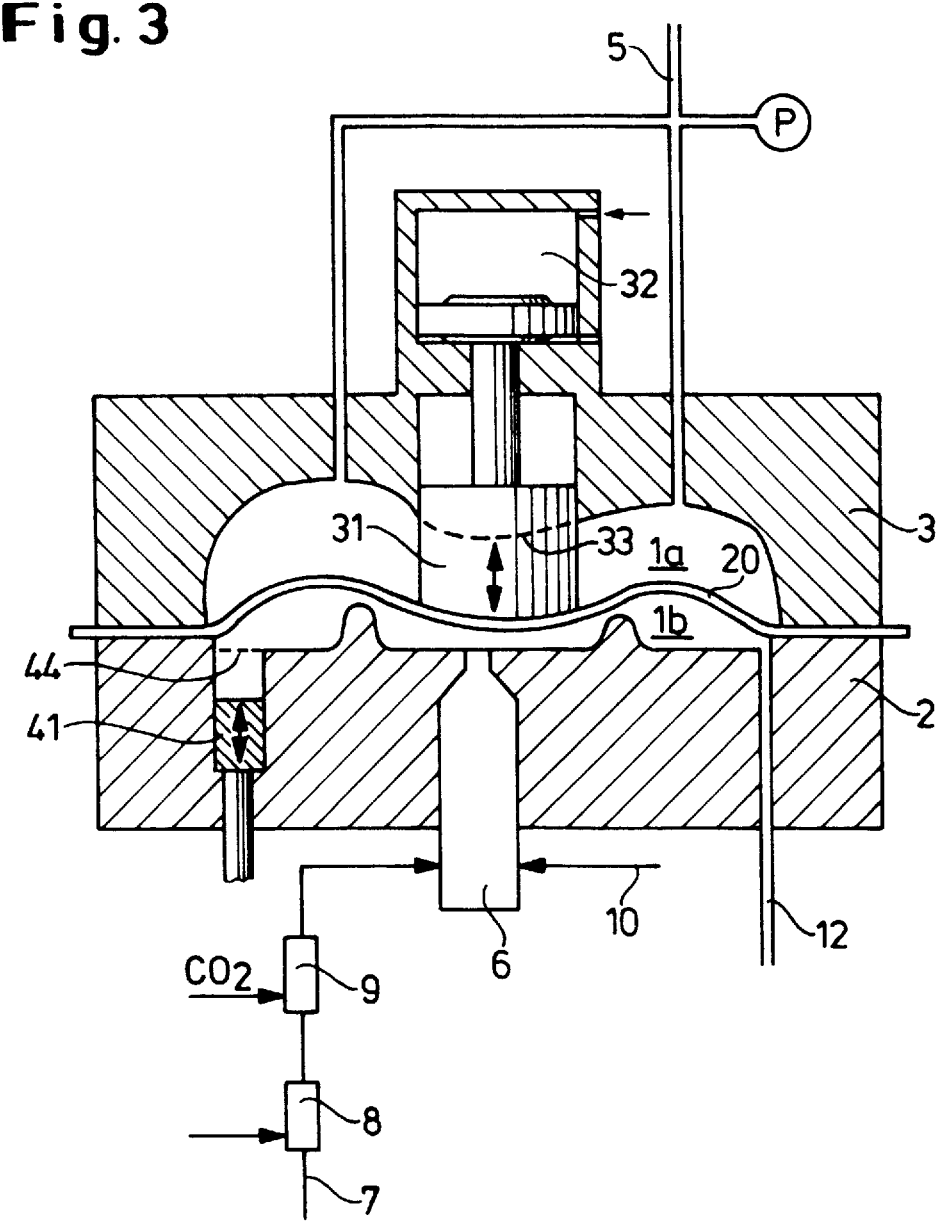

FIG. 3 shows a device according to FIG. 2 with the membrane 20 for dividing the mold cavity and with contour elements 31 and 41. The contour element 31, which can be moved into the mold cavity 1a, is located opposite the filling orifice of the mixer 6 and serves to throttle the inflowing reactive mixture so as to effect a rapid lateral distribution of the reactive mixture. When filling has ended, the contour element is retracted, e.g., by means of hydraulics or pneumatics 32, to form the contour 33, indicated as a broken line, of the molding to be manufactured.

Before the reactive mixture is filled into the mold cavity 1b, the movable contour element 41, represented by way of example, is driven into the mold cavity as far as the broken line 44 so that the membrane 20 can lie without irreversible deformation. As the membrane 20 separates from the contour of the cavity 1b, the contour element 41 can be retracted into the illustrated position.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the manufacture of polyurethane foam moldings by the introduction of a polyurethane reactive mixture containing a blowing agent into a mold cavity, by the introduction of a polyurethane reactive mixture containing a blowing agent into a mold cavity, foaming of the reactive mixture, curing and removal from the mold cavity, the improvement comprising:

(a) dissolving carbon dioxide under pressure in the polyurethane reactive mixture as the blowing agent, (b) introducing the reactive mixture into a closed mold cavity, (c) maintaining the gas pressure in the mold cavity during the introduction of the reactive mixture at a pressure being such that complete foaming of the reactive mixture is prevented, and (d) reducing the gas pressure in the mold cavity, with foaming of the reactive mixture, until the foamed reaction mixture fills the whole of the mold cavity, wherein said gas pressure in the mold cavity during the filling process is at least 50% of the saturation vapor pressure of the carbon dioxide originally dissolved in the reactive mixture.

2. The process of claim 1 wherein the mold cavity is divided by a flexible membrane in the mold parting plane into a first and second part, a gas pressure is applied to the first part of the mold cavity so that the membrane is lying against the contour of the second part of the mold cavity, the reactive mixture is introduced into the second part of the mold cavity and the gas pressure in the first part of the mold cavity is reduced until the membrane is lying against the contour of the first part of the mold cavity due to the foaming of the reaction mixture.

3. The process of claim 1 wherein the reactive mixture contains 0.5 to 7 wt. % of dissolved $CO_2$.

4. The process of claim 1 wherein the reactive mixture contains finely divided air bubbles as bubble nuclei for the release of dissolved $CO_2$.

5. The process of claim 1 wherein the mold cavity has at least one contour element which is opposite the inlet orifice for the reactive mixture and can be moved towards the inlet orifice, which contour element is moved towards the inlet orifice, during the introduction of the reactive mixture, so as to effect a rapid lateral distribution of the reactive mixture in the mold cavity.

6. The process of claim 1 wherein the reactive mixture is produced in a high-pressure countercurrent injection mixing head, at least one of the components fed into the mixing head containing $CO_2$ dissolved under pressure.

* * * * *